March 6, 1928.  W. F. GROENE ET AL  1,661,610
MACHINE TOOL
Filed Jan. 15, 1925  4 Sheets-Sheet 2
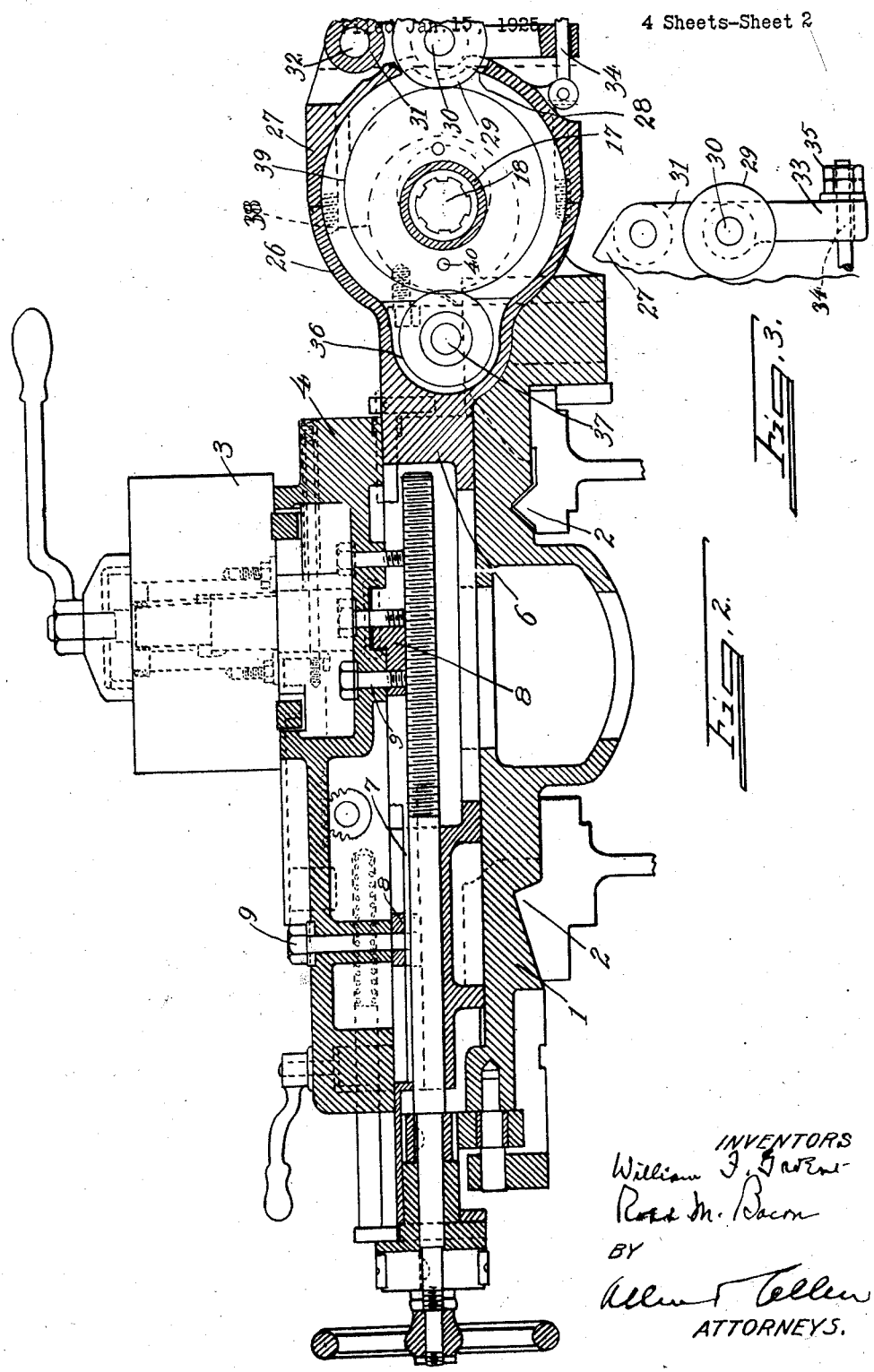

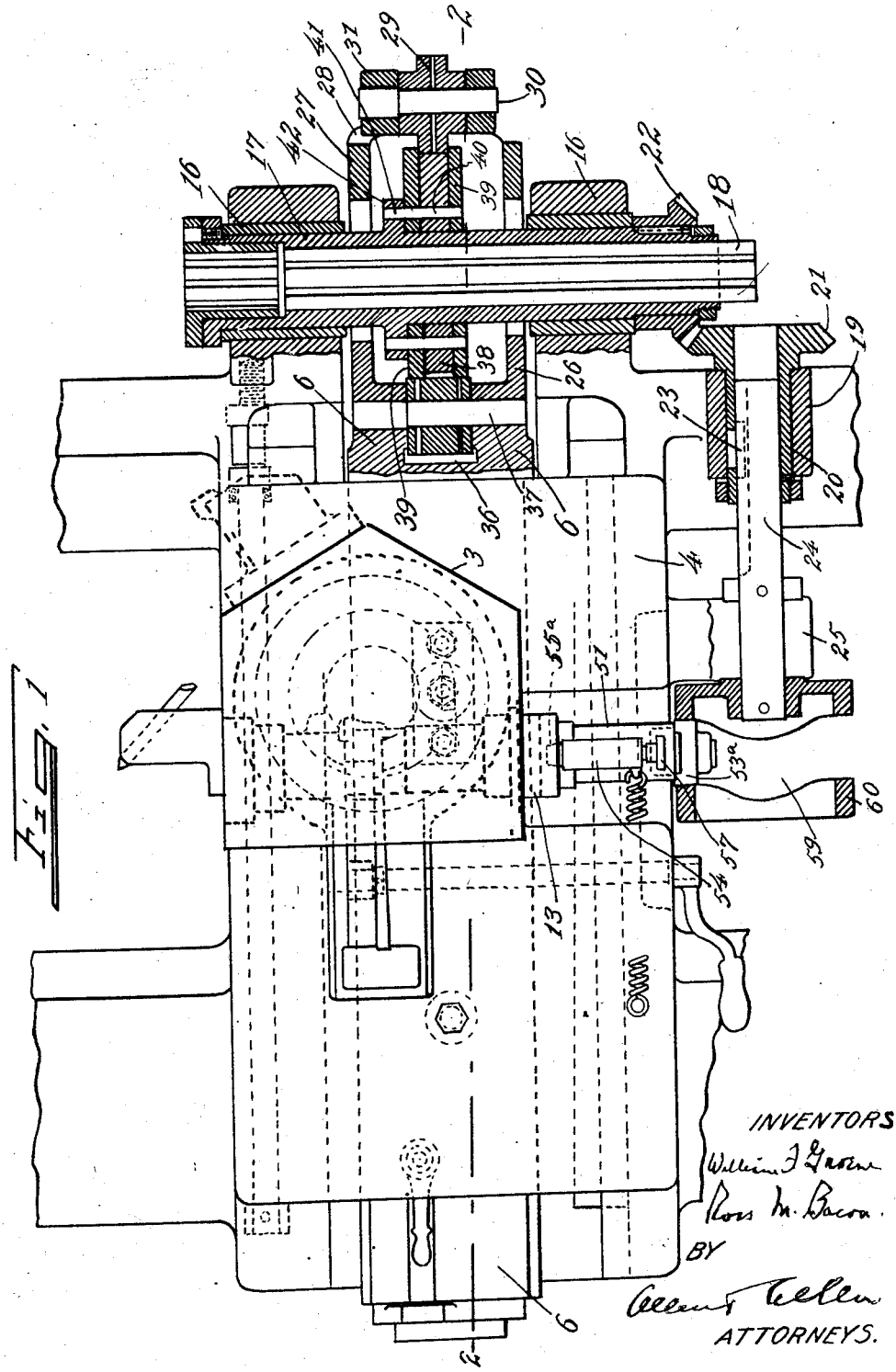

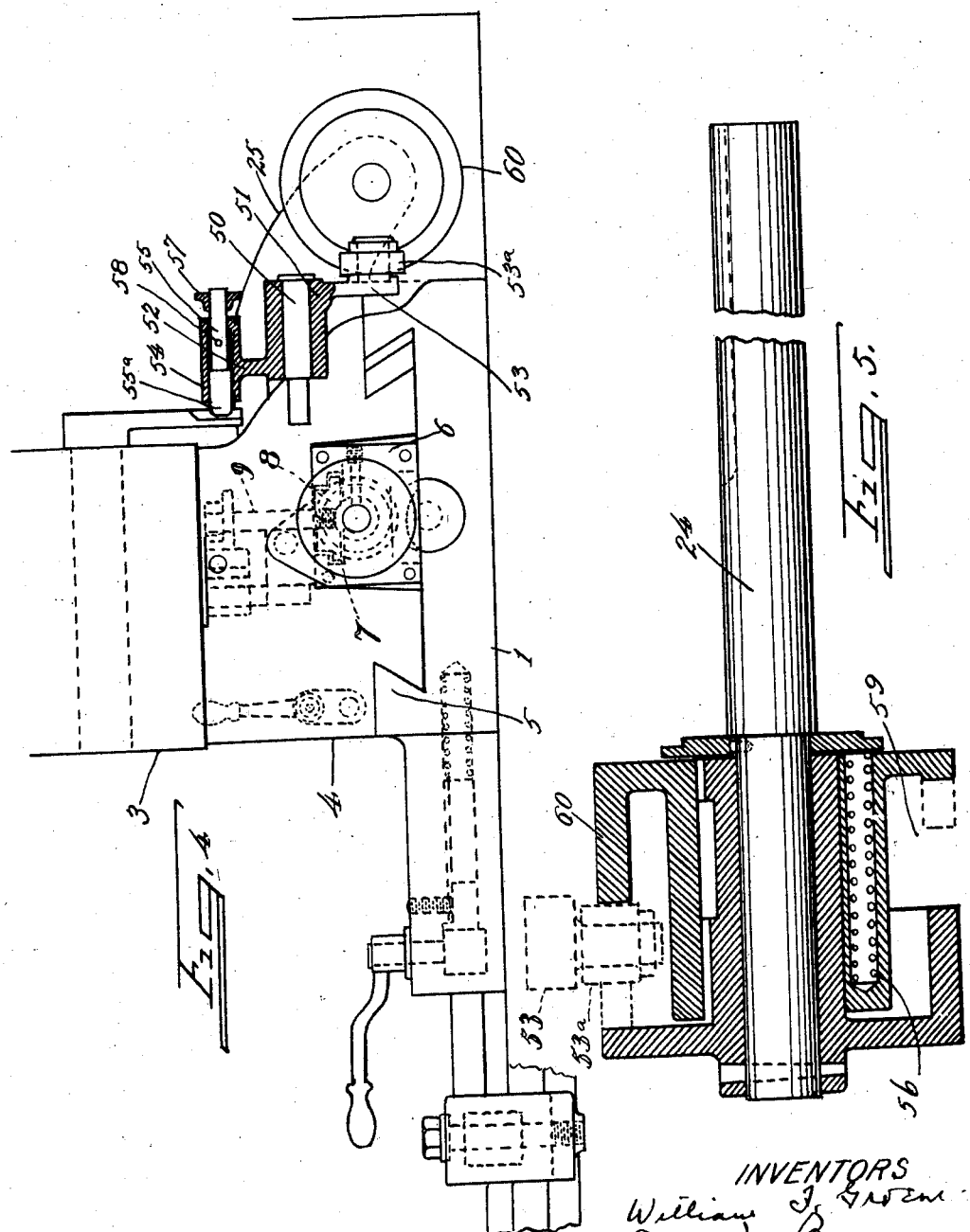

March 6, 1928.  1,661,610
W. F. GROENE ET AL
MACHINE TOOL
Filed Jan. 15, 1925  4 Sheets-Sheet 4
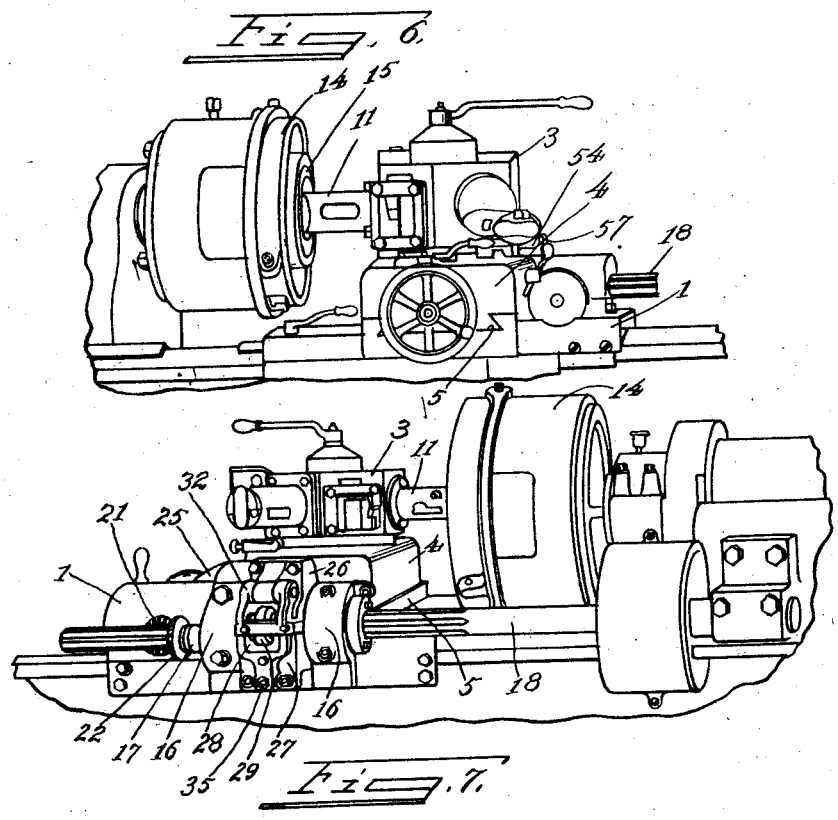
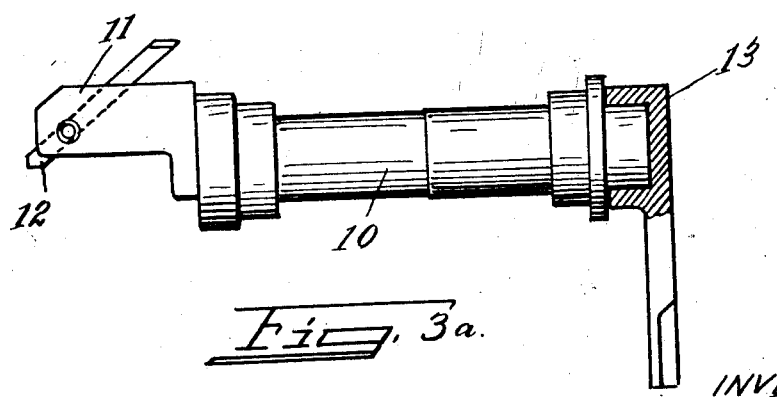
INVENTORS
William F. Groene
Ross M. Doem
BY
Allen & Allen
ATTORNEYS.

Patented Mar. 6, 1928.

1,661,610

UNITED STATES PATENT OFFICE.

WILLIAM F. GROENE AND ROSS M. BACON, OF CINCINNATI, OHIO, ASSIGNORS TO THE R. K. LE BLOND MACHINE TOOL COMPANY, OF CINCINNATI, OHIO, A CORPORATION OF DELAWARE.

MACHINE TOOL.

Application filed January 15, 1925. Serial No. 2,660.

Our invention relates to machine tools, and more particularly to turret lathes with automatic drives for the same, to permit of doing special work.

It is the object of our invention to provide means in turret lathes for enforcing upon not only the turret, but on the tool holders within the turret, a special motion calculated to cut most effectively when dealing with eccentric and odd shaped holes in metal pieces.

Another object is the provision of an improved master cam drive, which will be suitable for machine tools in general for the cross movement of the turret, and the provision of another cam drive, which will impart to the fixed cutter tool on the turret, the proper angularity for best accomplishing the cutting out of the walls of the rotating piece presented to the tool.

This additional drive for the tool holder is carried on the turret and receives its motion from the same power shaft that moves the turret, thereby insuring definite, prearranged action of the tool holder with relation to the line of cut on the piece, at all times.

We accomplish our objects by that certain construction and arrangement of parts to be hereinafter more specifically pointed out and claimed.

In the drawings:

Figure 1 is a plan view partly in section of the turret and slide, as used in the specific embodiment of my invention selected for illustration.

Figure 2 is a vertical section on the line 2—2 of Figure 1.

Figure 3 is a detail elevation of the return master cam engaging roller mounting.

Figure 3ª is a detail of the tool holder.

Figure 4 is a side elevation of the turret and slide parts, partly in section.

Figure 5 is a larger scale sectional detail of the tool rocking cam.

Figure 6 is a detail perspective side view of the machine.

Figure 7 is a like view to Figure 6 from the opposite side.

The slide is generally indicated at 1, and slides on V's 2 in the bed of the machine. The turret is indicated generally at 3, and is mounted on a support 4, which moves crosswise of the slide, being guided and held by a dovetail 5. There is nothing particular in this construction, and details of structure are not particularly shown, nor need they be described.

Extending through the center of the turret support is a bar 6, which at selected points has a T-shaped groove 7 therein, opening upwardly, and T-shaped plates 8 are set into the T-shaped groove, and drawn up tightly by means of bolts 9, so that the bar as it moves, causes the turret support with the turret thereon to move crosswise of the slide. Cam mechanism is provided to cause this bar to move lengthwise automatically.

The turret in this instance is formed as a five sided structure, although this is optional, the particular form being adapted to permit the special tool holder 10 to project out of the turret at both ends, at one side of the center on which the turret revolves.

The holder has at one end 11 the mounting for the tool 12, and at the other end which projects from the turret, the holder is equipped with a depending arm 13.

Cam mechanism is provided to rock this arm to and fro, thus rocking the tool holder in the turret, and changing the angularity of the tool with relation to the vertical plane of the machine.

It may now be observed that by providing a master piece, shaped as in the desired shape of the hole to be cut out by the tool, and by this master piece moving the bar 6 and the entire turret crosswise of the machine, and providing another cam which is cut correspondingly to the master cam to rock the tool holder, as determined by the best cutting position of the tool during the operations on the desired hole to be cut, and then bringing the slide up to a piece of work revolved on a proper center, that we will be able to very effectively cut any shaped hole that we desire.

We have indicated at 14 the chuck of the lathe in which is a piece 15, which for example may be a steel block into which is to be cut an eccentric hole, as for use in a cam pump.

We have not indicated the slide feed, as this may be of any desired type.

Mounted in bearings 16 at the one side of the slide, is a sleeve 17, which is formed with internal grooves lengthwise thereof. The shaft 18 that extends along the side of the machine from the chuck end thereof, is provided with splines to engage in said grooves, so that as the slide moves lengthwise of the bed, the shaft will slide in the sleeve but will continue to drive it.

In a journal 19 on the slide is a sleeve 20, which rotates in said journal, and has a beveled gear 21, that meshes with the beveled gear 22 on the end of the grooved sleeve 17, on the slide.

The sleeve 20 has a key 23 therein, which engages in a key-way in a shaft 24, which is held rotatably, but against endwise movement in the journal 25 on the turret support, which it will be recalled moves crosswise of the slide.

The sleeve 17 drives the master cam device for turret crosswise movement, and the shaft 24 drives the cam device for the tool holder rocking motion.

The end of the bar 6, which operates the turret, is provided with an expanded semicircular housing portion 26, having clearance for the sleeve at the sides, and forming half of the master cam housing on the inside. A matching semi-circular housing piece 27 is bolted to the portion 26, this second housing part having a hole 28 therein for passage of the double cam engaging roller.

This roller as indicated at 29 is a narrow faced roller mounted on a stub shaft 30. This shaft is itself mounted in a hanger 31, which is pivoted at 32 to the upper central portion of the housing piece 27, and is left open in the middle for the roller 29. The shaft is secured in the portions of the hanger bounding the sides of this opening.

The lower portion of the hanger terminates in a boss 33, in which is arranged the adjusting bolt 34. This bolt is pivotally secured to the housing piece 27, and has nuts 35 thereon, engaging the hanger and thus adjusting its position.

Located in the end of the bar 6 where it begins to flare outwardly into the semi-circular housing portion 26, is the inner master cam engaging roller 36, secured on a stub shaft 37, positioned in the bar.

The cam itself is formed of a central piece 38 and two outer pieces 39. These three pieces are bolted together by means of bolts passing through the holes 40 therein, and through holes 41 in the flange 42 on the drive sleeve 17. The bolts thus will hold the pieces of the cam together, and hold the assembly tightly to the drive sleeve. The cam pieces are formed to fit snugly over the sleeve, at their central portions.

The shape of the outer cams is the shape desired to be cut out of a piece of metal being worked upon. The shape of the two outer pieces is arranged, so that the distance from contact surface of a roller on the inner cam to contact surface of the roller on the two outer cams will be at all times the same.

It is evident that the diameter of a single cam varies considerably dependent, of course, upon the cam. This is also true of a line bisecting the center of an eccentric. Thus, without a large amount of spring take up, it would not be possible to use two rollers 180 degrees apart on a single cam, dependent, of course, on the shape of the cam.

With our construction, we cut the inner cam from the outer cams as a guide, so that a diameter cut through the assembly from the inner contact surface to the outer contact surface will always be the same length.

As a result of this the inner cam roller is thrust over for the motion of the turret in one direction, and the outer cam roller is thrust over for the motion of the turret in the other, and there is no alternate pushing and pulling, as in the case of a roller in a cam groove. Also there is a direct motion imparted to the turret support, without the intervention of any hinged joints. Also there is no necessity of any spring at all in holding the outer roller hanger in position, and a snug, smooth working fit of the bar 6 to the cam device is provided which will take all tendency to rattle and jerk at the turn, from the turret. A strong spring could be used between the nuts 35 and the boss of the hanger, but this is not necessary, and can be dispensed with.

The difficulty in automatic cross slide operating devices is that any rattle or jerk will result in the tool making an uneven cut, and thus the machine will be likely to turn out a poor piece of work.

It is to the end of avoiding this that we have addressed our invention, and we have addressed it also to the end of providing for all motions to the turret support being taken care of by a thrust action as distinguished from a pulling action.

Referring next to the tool operating devices, it will be recalled that the tool holder has a depending plate or arm 13. Mounted on a stud 50, at the back end of the turret support, is a sleeve 51 which has an upwardly extending arm 52 and a downwardly extending arm 53. In the arm 52 is formed another sleeve 54, in which slides a spring plunger 55. This plunger has an enlarged end 55$^a$ which engages a spring 56 within the sleeve, which is as internally large as the plunger portion 55$^a$, and at the outer end is of the diameter of the plunger. The plunger is operated by a head 57, which may be pulled back, whereupon a pin 58, which passes through a clearance notch in the end of the sleeve, can be turned laterally to engage the outside of the sleeve and hold the inner end 55$^a$ of the plunger out of operation. When the plunger is in its inner position the end 55ᵃ of the same, engages in a slot in the depending arm 13 on the tool holder.

The other arm 53 of the sleeve 51, carries a roller 53ᵃ, which rides in the groove 59 of the drum device 60.

It will be recalled that a shaft 24 was carried by the turret support and received motion through a key and slot connection with the slide. This shaft is fast to the drum device 60, and thus revolves it in geared relation to the sleeve 17, that revolves the master cam device.

As the cam drum revolves the roller 53ᵃ follows the groove, which is so developed that the tool holder is rocked to accomplish the exact position of contact of the cutting tool held in the other end of the holder.

The mechanism now described, is only part of the usual lathe, which otherwise can follow any preferred construction. It is evident that the exact mode of transmitting the motion to the turret and the tool holder, is preferential with us, and the essentials of the invention have already been pointed out and will be stated in the claims that follow.

Having thus described our invention, what we claim as new and desire to secure by Letters Patent, is:—

1. In a machine tool, means for imparting automatic motion from a master to a moving part comprising a member coupled to the part to be moved, a master cam device formed of a smaller inner cam and two larger outer cams held together in fixed relation, a wide roller to engage the outer cams, a narrow roller to engage the inner cam between the outer cams, said rollers being mounted on the said member and spaced substantially 180 degrees apart, and a hanger pivotally secured to the member for mounting one of the rollers, and means for adjusting the relation of the hanger to the member, to control the spacing of the rollers whereby the thrust on the moving part applies in both directions and always in the same line.

2. In a lathe the combination with a slide, a turret moving crosswise thereof, and a tool and holder therefor rotatably supported therein, of master cam means for moving the turret across the slide, and cam means driven with the master cam means for rocking the tool holder, said latter cam arranged to shift the tool in the holder during the cutting operation to best angularity for the cutting operation on a rotating piece of work.

3. In a lathe the combination with a slide, a turret moving crosswise thereof, and a tool and holder therefor rotatably supported in the turret, said turret being formed with a plurality of faces, and the holder mounted off center of the turret and extending through opposite faces thereof, master cam means for moving the turret across the slide, and cam means driven with the master cam means for rocking the tool holder.

4. In a lathe the combination with a slide, a turret moving crosswise thereof, and a tool and holder therefor rotatably supported therein, of master cam means for moving the turret across the slide, and cam means driven with the master cam means for rocking the tool holder, said latter cam arranged to shift the tool in the holder to best angularity for the cutting operation on a rotating piece of work, and a clutch element between the tool holder and the said latter cam.

5. In a lathe the combination with a slide, a turret moving crosswise thereof, and a tool and holder therefor rotatably supported in the turret, said turret being formed with a plurality of faces, and the holder mounted off center of the turret, and extending through opposite faces thereof, master cam means for moving the turret across the slide, and cam means driven with the master cam means for rocking the tool holder, said tool holder where it projects from the turret at the end away from the tool, having a depending arm, and a disconnectable member for engaging the arm, said member having an element thereon that is energized by said last named cam means.

WILLIAM F. GROENE.
ROSS M. BACON.